(12) United States Patent
Thurimella

(10) Patent No.: US 11,340,887 B2
(45) Date of Patent: May 24, 2022

(54) METHOD FOR PERFORMING A SOFTWARE UPDATE IN A CONTROL UNIT OF A MOTOR VEHICLE, AND MOTOR VEHICLE DESIGNED ACCORDINGLY

(71) Applicant: Audi AG, Ingolstadt (DE)

(72) Inventor: Anil Thurimella, Munich (DE)

(73) Assignee: Audi AG, Ingolstadt (DE)

( * ) Notice: Subject to any disclaimer, the term of this patent is extended or adjusted under 35 U.S.C. 154(b) by 10 days.

(21) Appl. No.: 16/971,909

(22) PCT Filed: Apr. 29, 2019

(86) PCT No.: PCT/EP2019/060966
§ 371 (c)(1),
(2) Date: Aug. 21, 2020

(87) PCT Pub. No.: WO2019/211247
PCT Pub. Date: Nov. 7, 2019

(65) Prior Publication Data
US 2021/0103436 A1  Apr. 8, 2021

(30) Foreign Application Priority Data
May 2, 2018  (DE) .................... 10 2018 206 720.1

(51) Int. Cl.
*G06F 8/65* (2018.01)
*G06N 20/00* (2019.01)

(52) U.S. Cl.
CPC .............. *G06F 8/65* (2013.01); *G06N 20/00* (2019.01)

(58) Field of Classification Search
CPC .................................. G06F 8/65; G06N 20/00
See application file for complete search history.

(56) References Cited

U.S. PATENT DOCUMENTS 8,655,541 B2  2/2014  You
9,946,531 B1  4/2018  Fields et al.
(Continued)

FOREIGN PATENT DOCUMENTS

CN  106802818 A  6/2017
CN  107291457 A  10/2017
(Continued)

OTHER PUBLICATIONS

Onuma et al "ECU Software Updating in Future Vehicle Networks". [Online], 2017, pp. 35-40, [Retrieved from interneton Jan. 3, 2022], <https://ieeexplore.ieee.org/stamp/stamp.jsp?tp=&arnumber=7929650> (Year: 2017).*

(Continued)

*Primary Examiner* — S. Sough
*Assistant Examiner* — Zengpu Wei
(74) *Attorney, Agent, or Firm* — Sterne, Kessler, Goldstein & Fox P.L.L.C.

(57) ABSTRACT

The present disclosure relates to a method for performing a software update in a control unit of a motor vehicle. The present disclosure provides that, during driving operation of the motor vehicle, a first analysis device of the motor vehicle is used to predict, for a predefined future time interval in which the control unit is operated in order to generate control data, an idle time interval in which the generation of the control data of at least one software module of the control unit is interrupted during the driving operation at least for a predefined minimum duration because of a vehicle state existing then, and the software update is started at the beginning of the idle time interval.

10 Claims, 2 Drawing Sheets

(56) References Cited

U.S. PATENT DOCUMENTS

| | | | |
|---|---|---|---|
| 10,279,757 B2 | 5/2019 | Netter | |
| 2011/0307882 A1 | 12/2011 | Shiba | |
| 2015/0128123 A1 | 5/2015 | Eling | |
| 2015/0191135 A1* | 7/2015 | Ben Noon | H04L 63/1408 726/22 |
| 2015/0301822 A1 | 10/2015 | Takahashi et al. | |
| 2017/0262277 A1* | 9/2017 | Endo | H04L 67/34 |
| 2017/0364138 A1* | 12/2017 | Chen | B60R 16/0236 |
| 2018/0113703 A1 | 4/2018 | Tschache | |
| 2019/0108010 A1* | 4/2019 | Tillman | G07C 5/0841 |
| 2019/0258467 A1* | 8/2019 | Frantz | G06F 8/65 |
| 2019/0347402 A1* | 11/2019 | Hamada | G06F 21/44 |
| 2020/0225930 A1 | 7/2020 | Teraoka et al. | |

FOREIGN PATENT DOCUMENTS

| | | | |
|---|---|---|---|
| CN | 107835501 A | 3/2018 | |
| DE | 102011088320 A1 | 3/2013 | |
| DE | 102015007493 A1 | 12/2016 | |
| DE | 102015014049 A1 | 5/2017 | |
| EP | 3074826 B1 | 12/2017 | |
| FR | 3057371 A1 | 4/2018 | |
| JP | 2018-063659 A | 4/2018 | |

OTHER PUBLICATIONS

International Preliminary Report on Patentability directed to related International Patent Application No. PCT/EP2019/060966, completed May 11, 2020, with attached English-language translation; 14 pages.

International Search Report and Written Opinion of the International Searching Authority directed to related International Patent Application No. PCT/EP2019/060966, with attached English-language translation, dated Aug. 7, 2019; 24 pages.

Written Opinion of the International Examining Authority directed to related International Patent Application No. PCT/EP2019/060966, with attached English-language translation, dated Feb. 19, 2020; 11 pages.

Jason Cong: "Machine Learning on FPGAs", 2015. http://cadlab.cs.ucla.edu/~cong/slides/HALO15_keynote.pdf.

* cited by examiner ically for the software update itself. Thus, the control data does not have to be generated during the software update, thereby saving energy.

METHOD FOR PERFORMING A SOFTWARE UPDATE IN A CONTROL UNIT OF A MOTOR VEHICLE, AND MOTOR VEHICLE DESIGNED ACCORDINGLY

TECHNICAL FIELD

The present disclosure relates to a method for performing a software update in a control unit of a motor vehicle. The method can be used to carry out the software update, in particular while the motor vehicle is in operation. The invention present disclosure also includes a motor vehicle which can carry out the method according to the invention present disclosure.

BACKGROUND

In a motor vehicle, it may be desirable to update the software of a control unit of the motor vehicle in a software update or to reinstall new, additional software in order to thereby expand and/or improve and/or correct the functional scope of the control unit. For instance, a motor vehicle can be coupled to a back-end device via a radio connection. The motor vehicle logs on to the back-end device in order to authenticate and authorize. The software update can then be carried out via the radio connection (so-called online software update). A back-end device can be a server (Internet server/server device), a computer center, a computer cluster, a cloud service, or a distributed and decentralized data center.

A software update can include, for example, the following scenarios. A user of a motor vehicle with a predefined nominal power (e.g. 105 hp) can set the nominal power to a higher nominal value (e.g. 150 hp). For this purpose, a software update can be carried out in the engine control unit. Even in the event of programming errors, the defective software can be replaced by a software update in a control unit of a motor vehicle.

From DE 10 2015 014 049 A1, it is known that there is a wait until the motor vehicle is in a parking phase (that is, not in the driving operation), in order then to receive program data or software data from the Internet and to install it in a control unit of the motor vehicle. By waiting for a parking phase, it should be ensured that the control unit is guaranteed not to be needed during the software update (software update). If the control unit were required during the software update, it could not provide the control data it expects, since its software is currently being replaced. However, waiting for a parking phase requires that a software update is only possible at sporadic times.

It is also known from DE 10 2011 088 320 A1 that one should first wait for an update state for a software update, which is that sufficient electrical energy can be provided by a battery in the motor vehicle and the motor vehicle is parked. It is therefore also impossible here that a software update is carried out while the motor vehicle is in driving operation.

It is known from DE 10 2015 007 493 A1 that a machine learning method can be used to model or learn an operating behavior of a motor vehicle in order to be able to make a statement about the operating behavior of the motor vehicle.

A technical article by Jason Cong (Jason Cong, "Machine Learning on FPGAs") describes how machine learning can be optimized using an FPGA (Field programmable gate array). In addition, further optimization options at processor level and server level/back-end level are mentioned.

SUMMARY

An object of the present disclosure is to carry out a software update in a control unit of a motor vehicle.

The object is solved by the subject matter of the independent claims. Advantageous embodiments of the present disclosure are described by the dependent claims, the following description, and the drawing.

The present disclosure provides a method for performing a software update in a control unit of a motor vehicle. When the motor vehicle is in operation, a control unit is operated, which thereby generates control data. The control data are generated by at least one software module of the motor vehicle. A software module provides one control function or a plurality of control functions. During driving operation, an analysis device of the motor vehicle now determines an idle interval for a predefined future time interval in which the control unit is used to generate the control data. It is operated by the control unit so that it generates control data when required. However, it does not actually have to generate control data throughout the entire time interval. The idle interval is characterized in that the generation of the control data of at least one software module of the control unit is interrupted during driving operation for at least a predefined minimum duration of time due to a vehicle condition that is then present. The control unit is therefore still operated, but at least one software module is probably not used in the idle interval to generate control data because the vehicle state does not require it.

The idle time interval is predicted by the first analysis device, which means that it is known in advance when the idle time interval will begin in the future and how long it will last. The software update is then started at the beginning of the idle time interval. Since it is known from the prediction that the idle time interval will last at least for the predefined minimum duration, i.e. that at least one software module of the control unit does not have to generate any control data during this time, the software update for the at least one software module is possible for this idle time interval. The software update can thus be carried out during the driving operation, in particular while the motor vehicle is rolling and/or an engine of the motor vehicle is in operation. The control unit can be operated to generate the control data. In a future time interval during the operation of the control unit, i.e. for example for the next ten minutes or the next hour or generally for a time interval of the duration from ten seconds to one hour, the idle time interval is then predicted in the time interval. The idle time interval thus represents a time slot during the driving operation, in which at least one software module does not have to generate control data in the control unit. This interruption in the generation of the control data in at least one software module can be used to carry out a software update for this at least one software module, for example software renewal or software expansion (new installation).

An advantage of the present disclosure is that in the motor vehicle no standby mode of the control unit is necessary, for example no parking phase. During operation of the control unit, at least one idle time interval is detected, in which at least one software module of the control unit is currently not required and can therefore be exchanged or updated in a software update.

Another advantage of the proposed software update is the high energy efficiency, which is due to the fact that it can be carried out quickly while driving and/or during the running time of the motor vehicle. If the software update is carried out during the runtime, there is no need to put the motor vehicle into operation exclusively for the software update. The motor vehicle also does not have to be left running for a long period of time just to carry out or complete a software update. All of this contributes to energy efficiency.

The present disclosure also includes further embodiments, which offer additional advantages.

One embodiment provides that, in order to recognize the idle time interval, it is determined on the basis of operating data which control tasks (so-called jobs) are transmitted to the control unit and/or which other vehicle component of the motor vehicle requests the at least one software module of the control unit. It is therefore determined when and/or who needs the at least one software module of the control unit. In a period in which the at least one software module is not required or requested, there is an idle time interval. The operating data used for this purpose can include, for example, communication data from a communication bus, for example a CAN bus (CAN—Controller Area Network) or a Flexray bus or a MOST bus (Media Oriented Systems Transport), and/or from an Ethernet network.

One embodiment provides that a plurality of software modules of the control unit are each provided as an independent software module and the software update comprises that an individual software update is carried out for at least one of the software modules independently of any other of the software modules. An update period for one of the software modules is then used as the minimum duration. It is therefore not necessary to replace or change the complete software of the control unit en bloc or as a whole during the software update. Due to the modular structure, the software update can also be carried out on a module basis, i.e. for each software module individually. Each software module can therefore be replaced or renewed independently of any other software module. The idle time interval is then determined for a minimum duration of time which is sufficient to renew or replace an individual software module. Such a software module is then of course exchanged or a software update is carried out which does not generate any control data in the idle time interval. Embedded software and/or software based on micro-components and/or micro-functions (i.e. the software modules) is therefore provided in the control unit and can be exchanged independently of one another by software update. A software update of such a micro-component takes less time than a software update of a monolytic overall software. Since the idle time interval only has to be found for a micro-component, i.e. for a single software module, there are more options for a software update, since the idle time interval can be shorter. The micro-components can implement a device function together. This division of a device function into a single, independent software module (micro-components) and/or the provision of a plurality of software components in the control unit allows a granularity of the software update to be set. The granularity can in particular be selectable. In particular, it is intended to provide microservices and/or a service-oriented architecture in order to provide the embedded software and/or software having the micro-components and/or micro-functions.

One embodiment provides that the first analysis device determines the idle time interval on the basis of a machine learning method and/or a predictive analytics method by using historical operating data of the motor vehicle in that at least one driving operation pattern of the motor vehicle is determined and the at least one driving operation pattern is detected for determining the idle time interval. In other words, the machine learning method is used to observe a state sequence of the control unit and/or a temporal course of the control data, which represents the historical operating data. Each driving operation pattern describes a typical sequence or a typical course, as has been observed multiple times in the motor vehicle. If the beginning of a driving operation pattern is then recognized by means of the machine learning method, the remaining, previously known course of the driving operation pattern can be used to predict how the motor vehicle, in particular the control unit, will behave in the future. If the driving operation pattern indicates an idle time interval or if the driving operation pattern contains an idle time interval, this can be predicted by means of the driving operation pattern. The machine learning method can be implemented on the basis of an artificial neural network and/or a Bayes estimator and/or a hidden Markov model, just to name a few examples. The embodiment has the advantage that historical operating data can be used to recognize an impending idle time interval.

One embodiment provides that the first analysis device is provided by a monitoring device that is different from the control unit. The control unit is thus observed from the outside by the first analysis device. The monitoring device determines said idle time interval on the basis of communication data which are transmitted between the control unit and at least one further vehicle component. This observation of communication data is also called logging. The monitoring device can be implemented, for example, by another control unit or by a combination of a plurality of control units. The embodiment has the advantage that an external influence acting on the control unit can be taken into account by the monitoring device. An example of a predictive analytics method is logistic regression analysis.

One embodiment provides that a second analysis device is provided in the control unit or within the control unit and the second analysis device predicts future calculation tasks requested in the control unit and these calculation tasks are carried out before their respective request and thereby an idle time of the control unit that increases the idle time interval is provided. An idle time is a period in which no calculation tasks have to be carried out in the control unit by a predefined software module. The software module is then idle. By pulling together or bringing forward the time intervals in which the calculation tasks have to be carried out, an idle time arises at the end of all the calculated calculation tasks, which can be used as an idle time interval, i.e. is available for the software update. However, by advancing the calculation time intervals in which calculation tasks are carried out, the calculation result is always available for each calculation task at the time of the request. This advance of calculation tasks can be carried out on one or more different levels of the control unit (hardware level, operating system level, service level). For example, this advance of calculation tasks can be implemented on the hardware level in an FPGA, i.e. the second analysis device can be implemented. A second analysis device can also be implemented by software of an operating system (OS). Middleware (support software, for example for communication between processes and/or control units) can also provide a second analysis device. The embodiment has the advantage that an idle time interval can be actively created. The main advantage of the second analysis device is the acceleration of the implementation of the software update. The first and the second analysis device together and the division into independent software modules (microcomponents) improve the performance of a software update. Such rapid software updates can also lead to new business models and/or use cases. For example, in the manner described at the beginning, a user can change the nominal output of the motor of his motor vehicle by means of a software update. The change in the functional scope of the motor vehicle via software update can also be limited to a predefined period of time. The range of functions can be limited, for example, to a rental period during which a user rents the motor vehicle. The motor vehicle thus becomes a mobile container, the range of functions of which can be changed by means of a software update, for example depending on rental contract data, for example within a few minutes.

One embodiment provides that the second analysis device determines the calculation tasks requested in the future on the basis of a machine learning method and/or predictive analytics method. This can be done in the same way as has already been described in connection with the first analysis device. A machine learning method and/or predictive analytics method has the advantage that the specific operating sequence in the motor vehicle can be taken into account on the basis of historical calculation tasks. For example, a typical driver behavior can be taken into account in this way, which can have an influence on the resulting calculation tasks (e.g. driving dynamics stabilization and/or trajectory calculation). The second analysis device can be based, for example, on the machine learning method for an FPGA mentioned at the beginning and/or can be implemented at the operating system level in order to increase the performance of a chip (integrated circuit)/SOCs (system on chip). In particular, an implementation of a machine learning method with predictive analytics is provided in an FPGA and/or at the operating system level, i.e. at a lower implementation level, in order to accelerate a chip and/or a SOC for the faster implementation of the software update.

One embodiment provides that, after the software update, malware detection is carried out by means of a minority classification relating to those control data which are generated by a new software module installed by the software update. A minority classification checks whether the control data generated by the new software module meet one or a plurality of predefined data patterns. If the control data does not fall into any of the data patterns, it is atypical control data that is classified as control data of malware. Accordingly, it signals that malware has been detected. This has the advantage that after a software update it is ensured that the correct or an authorized software module has been installed.

One embodiment provides that the software update includes a renewal of at least one software module and/or a new installation of an additional software module for a new control function. The method can therefore be used on the one hand for the renewal or improvement of an already installed software module. Additionally or alternatively, it can also be provided that a new control function is provided by installing an additional software module by means of the method. A software update is therefore a renewal and/or a new installation in the sense of the present disclosure. In particular, at least one of the following variants is can be implemented: Online software update (back-end device transmits software); software installation e.g. using USB medium (USB—universal serial bus) and/or CD (compact disc); a software update to fix a bug; a software update to install a new software module on the control unit (new functionality). A software update can be provided online (radio connection and/or Internet connection) or offline (with a portable storage medium).

The present disclosure also includes a motor vehicle in which the method according to the present disclosure can be carried out. In other words, a software update can be carried out in a control module in the motor vehicle. The motor vehicle accordingly has the control unit for generating the described control data. A first analysis device is provided for determining an idle time interval of the control unit that is likely to occur during driving operation. Overall, the control unit is set up to carry out an embodiment of the method according to the present disclosure. For this purpose, the first analysis device can be provided, for example, by the monitoring device described. The motor vehicle according to the present disclosure can be designed as a car, in particular as a passenger car or truck. The first analysis device can be implemented on the basis of a processor device, which can have at least one microcontroller and/or at least one microprocessor. The first analysis device can be implemented on the basis of a program code, which can be stored in a data storage of the processor device. The at least one new software module that is to be installed by the software update can be received in the motor vehicle via a radio connection (for example mobile radio or WLAN—wireless local area network) from the Internet and/or from a back-end device.

The present disclosure also includes the combinations of the features of the described embodiments.

BRIEF DESCRIPTION OF THE DRAWING

Exemplary embodiments of the present disclosure are described below, in which.

DETAILED DESCRIPTION

The exemplary embodiments explained below are embodiments of the present disclosure. In the exemplary embodiments, the components of the embodiments that are described each constitute individual features of the present disclosure to be considered independently of one another, which individually also further develop the present disclosure independently of one another and are thus also to be considered part of the present disclosure both individually and in a combination that is different from the combination described. In addition, the embodiments described may also be supplemented by further features of the present disclosure which have already been described.

Figure 1:
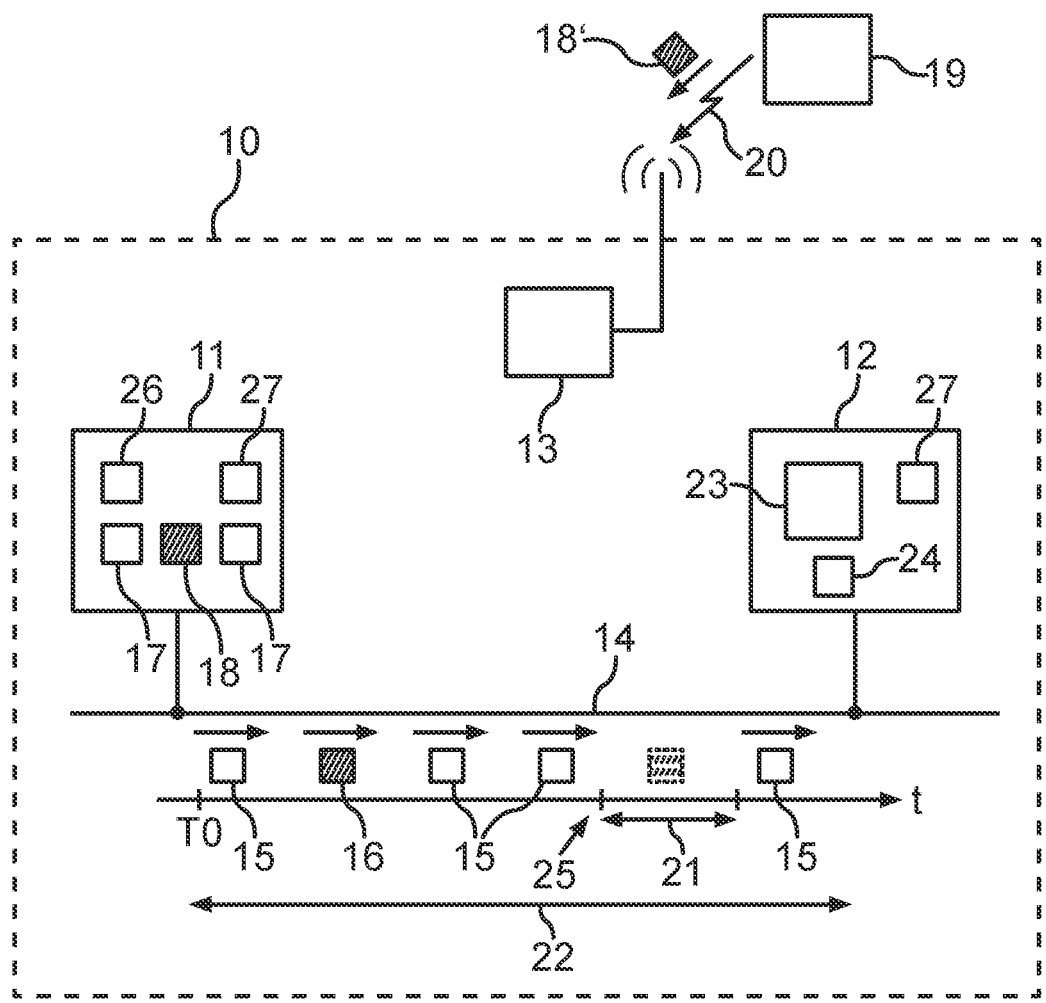
FIG. 1 discloses a schematic representation of an embodiment of the motor vehicle according to the present disclosure.

FIG. 1 shows a motor vehicle 10, which can be, for example, a motor vehicle, in particular a passenger car or truck. In the motor vehicle 10, a control unit 11, a first analysis device 12, which can also be implemented, for example, by a control unit, a communication device 13, and a communication bus 14 are shown. The control unit 11 can generate control data 15, 16, which can be sent, for example, via the communication bus 14 to at least one other control unit and/or to at least one actuator and/or at least one sensor. The communication bus 14 can be, for example, a CAN bus (CAN—Controller Area Network) or a Flexray bus. To generate the control data 15, 16, software modules 17, 18 can be provided in the control unit 11, which can be executed by a processor device of the control unit 11, for example at least one microprocessor. In FIG. 1, a distinction is made between the control data 15 of the software modules 17 and the control data 16 of the software module 18. Each software module can provide at least one control function of the control unit 11. In the following, software module 17, 18 is used synonymously for the control function provided by the respective software module 17, 18.

An update can be provided for the software module 18 in which a new or corrected software module 18' is provided by a data source 19. The data source 19 can be external to the vehicle and can be, for example, a back-end device of the Internet. The new software module 18' can be received by the communication device 13 via a radio connection 20. The communication device 13 can be received, for example, on the basis of a mobile radio module (for example 3G, 4G or 5G) and/or a WLAN radio module (WLAN—Wireless Local Area Network). The new software module 18' is intended to replace the software module 18. In this case, however, it should be avoided that the control unit 11 first goes into a standby mode, that is, stops generating control data 15, 16. Rather, the software update of the new software module 18' is to be carried out during the driving operation of the motor vehicle 10.

This can be implemented by means of the first analysis device 12. In order to illustrate the functioning of the first analysis device 12, a time sequence of the control data 15, 16 generated by the control unit 11 is illustrated in FIG. 1 over the time t. A current time is entered as T0 on the timeline. Starting from the current point in time T0, the first analysis device 12 can predict for a future time interval 22 which control data 15, 16 will probably be generated by the control unit 11, in particular by the individual software modules 17, 18 in the future. For this purpose, the first analysis device 12 can use a predictive analytics method and/or a machine learning method 23. This can, for example, observe operating data of the motor vehicle. For example, control tasks that are transmitted to the control unit 11 and/or request data that indicate which other vehicle component is requesting at least one control function of the control unit 11 can be determined.

The idle time interval 21 can then be predicted, which can lie within the time interval 22 and will last or even outlast a predefined minimum duration 24. This ensures that the software module 18 to be exchanged is not required during the idle time interval 21 and thus the driving operation of the motor vehicle 10 is not disturbed if the software module 18 is not available during the idle time interval 21 because its program code or software module is replaced with the new software module 18'. At a beginning 25 of the idle time interval 21, a software update of the software module 18' in the control module 11 can be carried out, by which the software module 18 is replaced. Thereafter, control data 16 can then be generated again by the newly installed software module 18'. The driving operation of the motor vehicle 10 therefore does not have to be interrupted for the software update.

In order to actively create the idle time interval 21, a second analysis device 26 can be provided in the control unit 11 itself. The analysis device 26 can predict calculation tasks and carry them out in advance, so that an idle time interval 21 can thereby be created, in which at least the software module 18 does not have to carry out any calculations.

After the software update of the software module 18', malware detection 27 can be carried out, which can have both a component in the control unit 11 and a component in another control unit, for example the control unit of the first analysis device 12. The control data generated by the new software module 18' can be checked by means of a minority classification to determine whether they represent control data typical of the control unit 11. Otherwise, malware is signaled.

In the motor vehicle 10, the next activities of the control unit 11 are thus predicted by means of a first analysis device 12 (based on a machine learning method 23) at the vehicle level (outside the control unit 11). The software update or the software update is controlled on the basis of the prediction, so that the software update has no influence on the dynamic behavior or the driving behavior of the motor vehicle 10. A software update can thus be carried out during the driving operation.

The functionality and components of the control unit 11 are structured or divided into independent micro-components, i.e. individual software modules, such that a control function can be exchanged individually, independently of the other control functions by exchanging the corresponding software module independently of the other software modules.

A second analysis device 26 (using the machine learning method) can predict the future calculation tasks in the control unit 11 at the control unit level (i.e. in the control unit 11). This second analysis device can be used to carry out a prediction on at least one implementation level (for example low level, such as in an FPGA, and/or on a higher level, for example operating system level and/or middleware level). Such a prediction of the calculation tasks and bringing them forward within the control unit 11 can increase the calculation speed of the calculation tasks and/or advance them in time. In this way, an idle time interval can be created, the duration of which is sufficient to carry out the software update.

Both analysis devices can be used to carry out the malware detection 27, which makes it possible to detect malware (malware and/or cyber attacks) on the basis of a minority classification.

The updates or software updates, which are controlled on the basis of a machine learning method, are highly efficient and there is no need to put the motor vehicle into a sleep mode or into a parking mode in order to carry out a software update. The safety and reliability of the motor vehicle can be increased or improved by the possibility of carrying out a software update at any time, in particular for automated driving. The manipulation of a motor vehicle is also made more difficult by the detection of malware. The rapid or time-independent software updates (no parking operation required) can also make it possible to provide a software module having different features depending on the booking of an additional control function and/or a change in a control function. For example, a user can increase the engine power of his motor vehicle for a predefined rental period, for example for the holidays, for example for a week or a predefined number of weeks or days or hours, by renting or leasing a corresponding control function. This can then be provided by a software update in the motor vehicle. In the case of a rental vehicle as well, depending on the currently concluded rental contract, the motor vehicle can be equipped with one or a plurality of control functions specified in the rental contract by means of a software update. At the end of the rental agreement or at the beginning of another rental agreement, the motor vehicle can also be adapted again by means of a further software update. The motor vehicle thus becomes a mobile container, the functionality of which can be adapted to a user's current need by means of a software update.

The first and the second analysis device together and the division into independent software modules (micro-components) thus improve the performance of a software update. Such rapid software updates can also lead to new business models and/or use cases. For example, in the manner described at the beginning, a user can change the nominal output of the motor of his motor vehicle by means of a software update. The change in the functional scope of the motor vehicle via software update can also be limited to a predefined period of time. The range of functions can be limited, for example, to a rental period during which a user rents the motor vehicle. The motor vehicle thus becomes a mobile container, the range of functions of which can be changed via software update, for example depending on rental contract data, for example within a few minutes (for example less than 10 minutes).

The software update itself can be carried out on the basis of the mechanisms known per se, i.e., for example, the transfer of a new software module 18' via a radio connection and the installation of a software module in a control unit. In addition, the first analysis device that provides the machine learning method can then be added. The first analysis device can interact with at least one control unit of the motor vehicle in order to log operating data, from which at least one driving operation pattern can then be determined for the prediction of an idle time interval. The second analysis device can then, by using the machine learning method, be provided in each control unit 11 in which the software update described is to be carried out.

Figure 2:
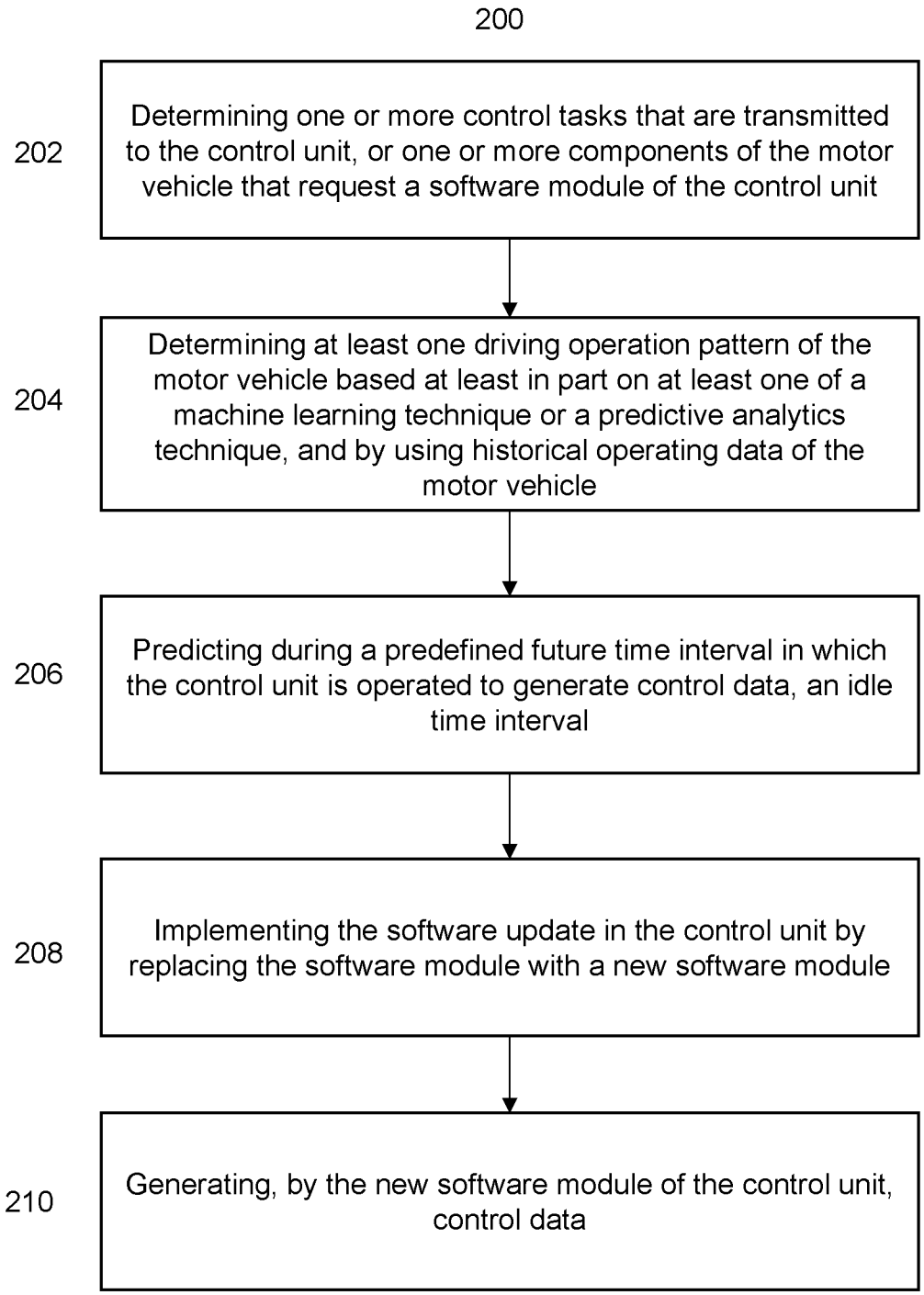
FIG. 2 discloses an example method according to example embodiments of the present disclosure.

FIG. 2 discloses an example method (200) for performing a software update in a control unit of a motor vehicle. At (202), the method (200) can include determining, by a first analysis device of the motor vehicle, one or more control tasks that are transmitted to the control unit, or one or more components of the motor vehicle that request a software module of the control unit. At (204), the method (200) can include determining, by the first analysis device, at least one driving operation pattern of the motor vehicle based at least in part on at least one of a machine learning technique or a predictive analytics technique, and by using historical operating data of the motor vehicle.

At (206), the method (200) can include predicting, by the first analysis device, during a predefined future time interval in which the control unit is operated to generate control data, an idle time interval in which the generation of the control data by the software module of the control unit is interrupted during the driving operation at least for a predefined minimum duration because of a vehicle state existing then. The idle time interval can be predicted during a driving operation of the motor vehicle, while the motor vehicle is rolling or an engine of the motor vehicle is in operation. The idle time interval can be predicted based at least in part on the at least one driving operation and the one or more determined control tasks or the one or more determined components of the motor vehicle.

At (208), the method (200) can include implementing the software update in the control unit by replacing the software module with a new software module. The software update can be implemented at a beginning of the idle time interval. At (210), the method (200) can include generating, by the new software module of the control unit, control data. The method (200) can be implemented such that the driving operation of the motor vehicle is not interrupted during the implementing the software update.

Overall, the examples show how the present disclosure can be used to carry out a quick, efficient, and safe update in a motor vehicle.

The invention claimed is:

1. A method for performing a software update in a control unit of a motor vehicle, the method comprising:

determining, by a first analysis device of the motor vehicle, one or more control tasks that are transmitted to the control unit, or one or more components of the motor vehicle that request a software module of the control unit;

determining, by the first analysis device, at least one driving operation pattern of the motor vehicle based at least in part on at least one of a machine learning technique or a predictive analytics technique, and by using historical operating data of the motor vehicle;

during a driving operation of the motor vehicle, while the motor vehicle is rolling or an engine of the motor vehicle is in operation, predicting, by the first analysis device, during a predefined future time interval in which the control unit is operated to generate control data, an idle time interval in which the generation of the control data by the software module of the control unit is interrupted during the driving operation at least for a predefined minimum duration because of a vehicle state existing then, wherein predicting the idle time interval comprises predicting a start time and an end time of the idle time interval based at least in part on the at least one driving operation pattern and the one or more determined control tasks or the one or more determined components of the motor vehicle;

at the predicted start time of the idle time interval, implementing the software update in the control unit by replacing the software module with a new software module; and generating, by the new software module of the control unit, the control data;

wherein the driving operation of the motor vehicle is not interrupted during the implementing the software update.

2. The method according to claim 1, wherein the control unit comprises a plurality of software modules, and wherein implementing the software update comprises replacing the software module independently of any other of the software modules of the plurality of software modules, and wherein the minimum duration is an updated duration for which at least one software module is used.

3. The method according to claim 2, wherein at least one software module of the plurality of software modules represents a micro-component or a micro-function of a device function.

4. The method according to claim 3, wherein the control unit comprises a micro-services or a service-oriented architecture to provide embedded software or software with the micro-components or micro-functions.

5. The method according to claim 1, wherein the first analysis device is implemented in a monitoring device different from the control unit, and wherein the monitoring device is configured to determine the idle time interval based at least in part on communication data transferred between the control unit and at least one further vehicle component.

6. The method according to claim 1, wherein the control unit comprises a second analysis device, and wherein the method further comprises:

predicting, by the second analysis device, future calculation tasks requested in the control unit based at least in part on the at least one of the machine learning technique or the predictive analytics technique; and implementing the calculation tasks before the calculation tasks are actually requested.

7. The method according to claim 6, wherein the second analysis device is configured to predict the future calculation tasks at an operating system level or using a field programmable gate array (FPGA).

8. The method according to claim 1, further comprising:
after the software update, implementing, malware detection based at least in part on a minority classification relating to the control data generated by the new software module of the software update; and
determining whether the control data generated by the new software module meet one or more predefined data patterns;
when the control data do not meet the one or more predefined data patterns, classifying the control data as control data of malware; and
signaling that malware has been detected.

9. The method according to claim 1, wherein implementing the software update comprises renewing at least one software module or a new installation of an additional software module for a new control function.

10. A motor vehicle comprising a control unit for generating control data, wherein the control unit is configured to perform operations comprising:
determining, by a first analysis device of the motor vehicle, one or more control tasks that are transmitted to the control unit or one or more components of the motor vehicle that request a software module of the control unit;
determining, by the first analysis device, at least one driving operation pattern of the motor vehicle based at least in part on at least one of a machine learning technique or a predictive analytics technique by using historical operating data of the motor vehicle;
during a driving operation of the motor vehicle, while the motor vehicle is rolling or an engine of the motor vehicle is in operation, predicting, by the first analysis device, during a predefined future time interval in which the control unit is operated to generate the control data, an idle time interval in which the generation of the control data by the software module of the control unit is interrupted during the driving operation at least for a predefined minimum duration because of a vehicle state existing then, wherein predicting the idle time interval comprises predicting a start time and an end time of the idle time interval based at least in part on the at least one driving operation pattern and the one or more determined control tasks or components of the motor vehicle;
at the predicted start time of the idle time interval, implementing the software update in the control unit by replacing the software module with a new software module; and
generating, by the new software module of the control unit, the control data;
wherein the driving operation of the motor vehicle is not interrupted during the software update.

* * * * *